(12) United States Patent
Jones

(10) Patent No.: US 6,744,013 B2
(45) Date of Patent: Jun. 1, 2004

(54) WELDING TORCH FOR USE IN GAS METAL ARC WELDING

(75) Inventor: Donald Frederick Jones, Pershore (GB)

(73) Assignee: Parweld Limited (GB)

( * ) Notice: Subject to any disclaimer, the term of this patent is extended or adjusted under 35 U.S.C. 154(b) by 0 days.

(21) Appl. No.: 10/227,134

(22) Filed: Aug. 23, 2002

(65) Prior Publication Data

US 2003/0057196 A1 Mar. 27, 2003

(30) Foreign Application Priority Data

Aug. 24, 2001 (GB) .............................................. 0120681
Aug. 24, 2001 (GB) .............................................. 0120685

(51) Int. Cl.[7] .............................................. B23K 9/173
(52) U.S. Cl. .............................. 219/137.42; 219/137.61; 219/137.62
(58) Field of Search ...................... 219/137.42, 137.61, 219/137.62

(56) References Cited

U.S. PATENT DOCUMENTS

| 2,881,305 | A | * | 4/1959 | Wojciak et al. | ........ 219/137.42 |
|---|---|---|---|---|---|
| 3,270,179 | A | | 8/1966 | Russell | ........................ 219/74 |
| 3,529,126 | A | * | 9/1970 | Reeh | ...................... 219/137.62 |
| 3,597,576 | A | | 8/1971 | Bernard et al. | ........ 219/137.43 |
| 4,529,863 | A | * | 7/1985 | Lebel | ...................... 219/137.42 |
| 4,560,858 | A | * | 12/1985 | Manning | ................ 219/137.52 |
| 5,611,951 | A | | 3/1997 | Kunz et al. | ............. 219/137.62 |
| 5,726,420 | A | | 3/1998 | Lajoie | ................... 219/137.61 |
| 6,495,798 | B1 | * | 12/2002 | Enyedy | .................. 219/137.62 |

* cited by examiner

Primary Examiner—M. Alexandra Elve
Assistant Examiner—Kevin P. Kerns
(74) Attorney, Agent, or Firm—Iandiorio & Teska

(57) ABSTRACT

A welding torch (2) for use in gas metal arc welding, including a neck portion (4), a diffuser (6) at a first end (8) of the neck portion (4), a contact tip (10) which extends from the diffuser (6), and connector means (12) which is at a second end (14) of the neck portion (4) and which is for connecting the neck portion (4) to a power cable assembly; the neck portion (4) including an electrical conductor (16) and a longitudinally extending passageway (18); electrical current transfer from the electrical conductor (16) to the contact tip (10) being effected using first and second longitudinally separated contact areas (22, 24) on the contact tip (10); and the welding torch (2) including a gas chamber (30) which is positioned longitudinally between the two contact areas (22, 24) and radially between the contact tip (10) and the diffuser (6).

7 Claims, 6 Drawing Sheets

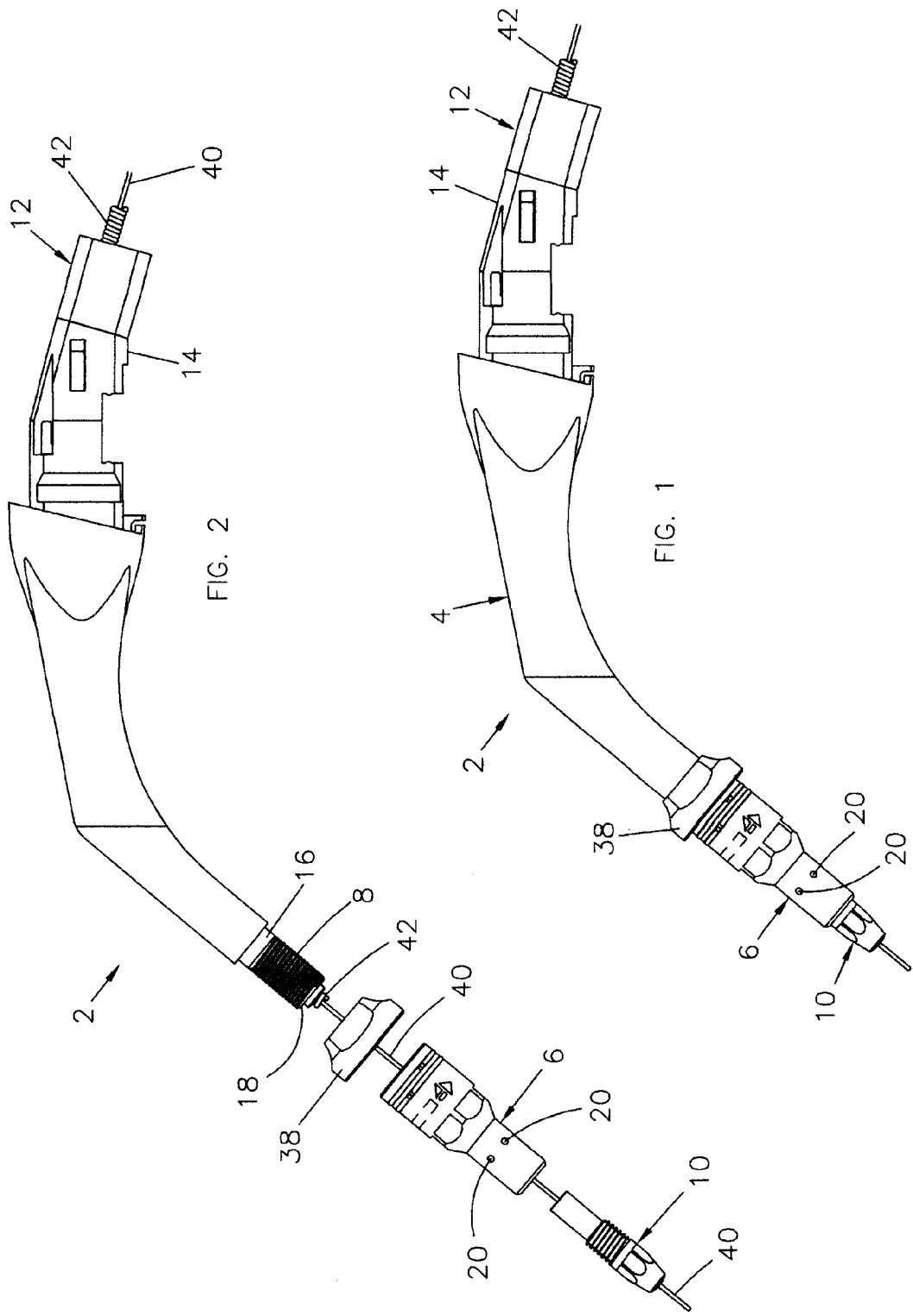

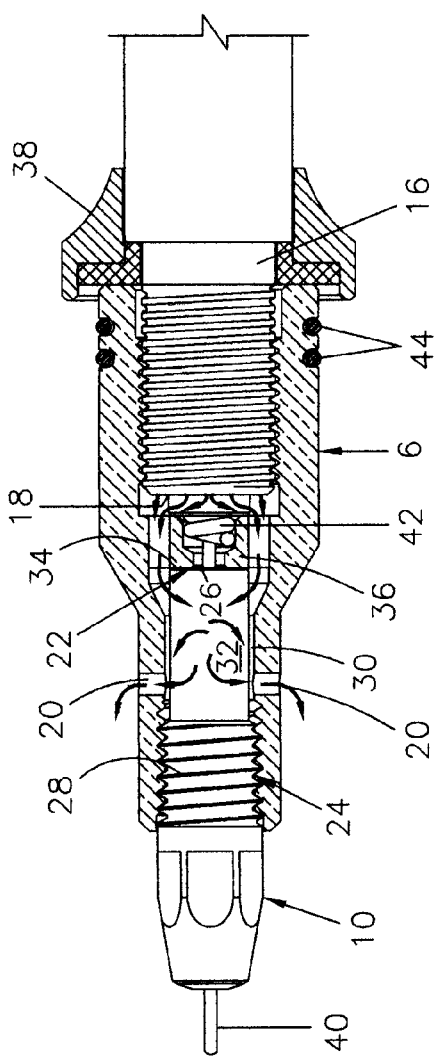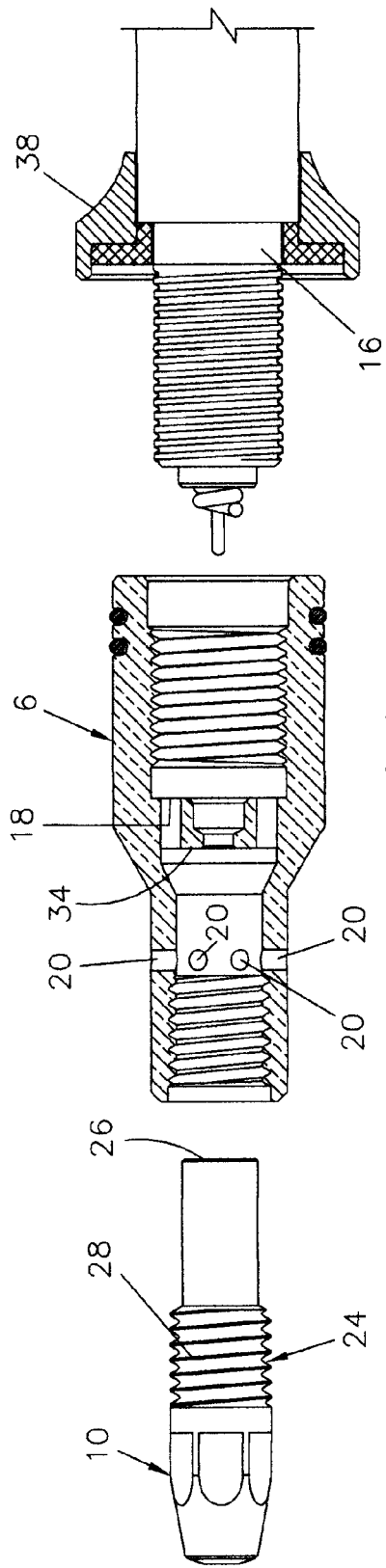

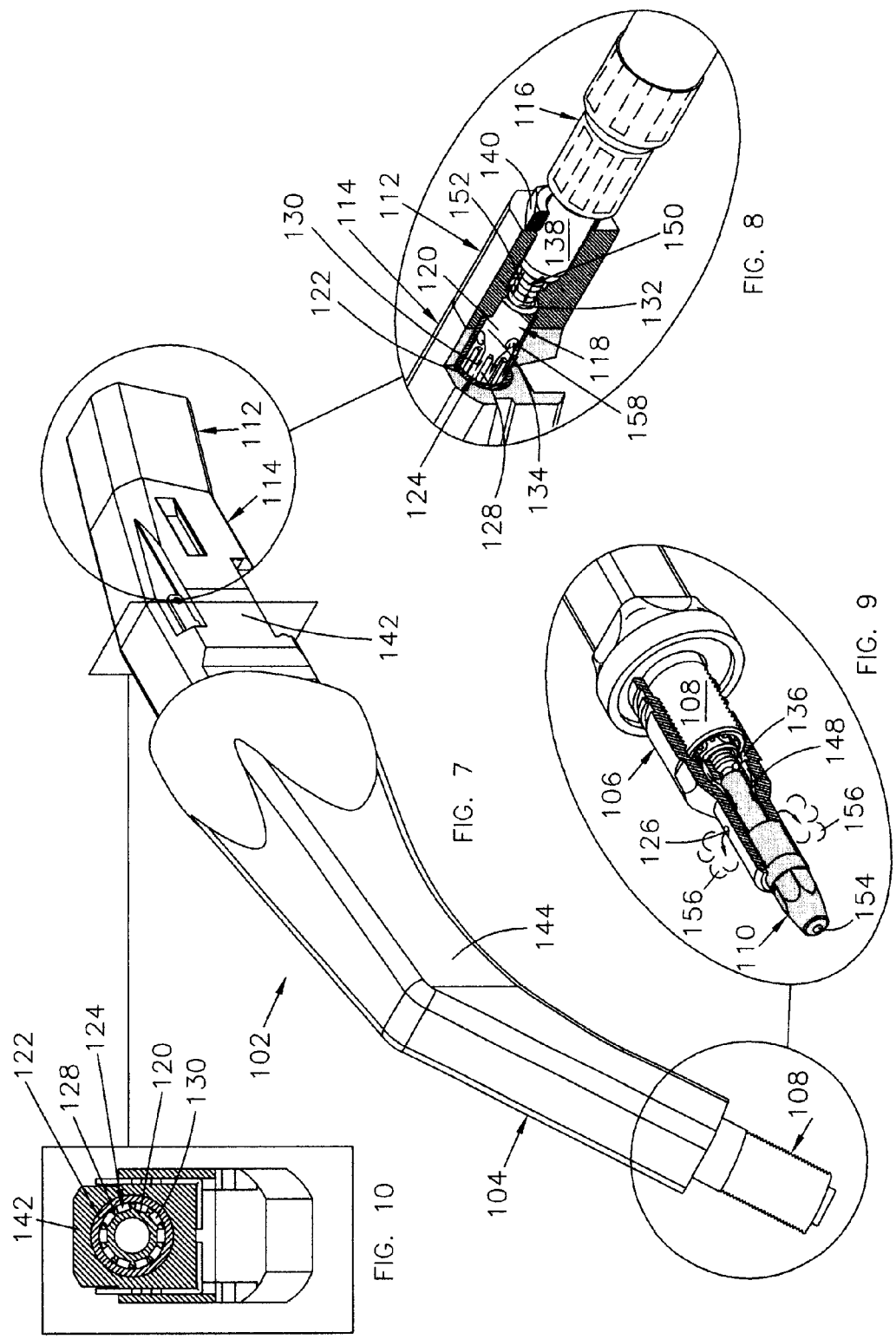

WELDING TORCH FOR USE IN GAS METAL ARC WELDING

BACKGROUND OF THE INVENTION

This invention relates to a welding torch for use in gas metal arc welding.

Welding torches for use in gas metal arc welding are well known. The gas metal arc welding is often referred to as MIG (metal inert gas) welding. The welding process uses an electrical arc between a consumable electrode wire and a weld being formed. The weld being formed is protected from atmospheric contamination by a blanket of shielding gas which is an inert gas, or a combination of an inert gas plus other gases.

The known welding torches comprise a neck portion, a diffuser at a first end of the neck portion, a contact tip which extends from the diffuser, and connector means which is at a second end of the neck portion and which is for connecting the neck portion to a power cable assembly. The neck portion comprises an electrical conductor and a longitudinally extending passageway. The power cable assembly is such that it supplies electricity and gas to the welding torch. The welding torch causes the gas from the power cable assembly to flow along the passageway and out of the welding torch through at least one aperture in the diffuser. The gas is usually supplied without the application of pressure.

The neck portion of the welding torch is often referred to as a swan neck or a goose neck. The consumable electrode wire passes continuously through the diffuser and is consumed during the welding. The contact tip transfers the electric current from the electrical conductor in the neck portion to the continuously moving consumable electrode wire.

The consumable electrode wire is consumed at a relatively high speed. Electrical current transfer efficiency from the electrical conductor in the neck portion to the diffuser and the contact tip is of paramount importance. Heat generated in the current transfer and in the proximity of the arc directly affects the efficiency of the contact tip. The contact tip is made of copper or a copper alloy because of the need to use a material which has good electrical conductivity. However, the copper or the copper alloy is prone to expand and self-anneal. The contact tip material thus becomes soft, which in turn gives a decreased wear resistance, and also impinges on free movement between a bore in the contact tip and the consumable electrode wire which passes through this bore.

SUMMARY OF THE INVENTION

It is an aim of the present invention to reduce the above mentioned problems by providing a welding torch which has improved contact tip electrical current transfer, and which utilizes the gas used for shielding the weld also as a cooling agent for cooling a substantial part of the contact tip surface area.

Accordingly, in one non-limiting embodiment of the present invention there is provided a welding torch for use in gas metal arc welding, which welding torch comprises a neck portion, a diffuser at a first end of the neck portion, a contact tip which extends from the diffuser, and connector means which is at a second end of the neck portion and which is for connecting the neck portion to a power cable assembly: the neck portion being such that it comprises an electrical conductor and a longitudinally extending passageway; the power cable assembly being such that it supplies electricity and gas to the welding torch, the gas being for protecting welds from atmospheric contamination as the welds are made using the welding torch; the welding torch being such that it causes the gas from the power cable assembly to flow along the longitudinally extending passageway and out of the welding torch through at least one aperture in the diffuser; the welding torch being such that the electrical current transfer from the electrical conductor to the contact tip is effected using first and second longitudinally separated contact areas on the contact tip, the first contact area being an end face of the contact tip adjacent the diffuser, and the second contact area being a threaded portion of the contact tip which secures the contact tip in the diffuser; and the welding torch being such that it includes a gas chamber which is positioned longitudinally between the two contact areas and radially between the contact tip and the diffuser whereby the gas in the gas chamber flows over a part of the contact tip between the two contact areas and cools this part of the contact tip before flowing out of the welding torch through the said at least one aperture in the diffuser.

The welding torch of the present invention is thus able to provide good metal to metal contact at the two contact areas. The welding torch is also able to use the gas in an extra capacity for the cooling of the part of the contact tip. The efficiency of operation of the welding torch of the present invention is thus increased over the above mentioned known welding torches.

Preferably, the welding torch is one in which the end face of the contact tip abuts against a transverse face of an internal part of the diffuser. The conductor then abuts against an opposite side of this internal part of the diffuser. Alternative arrangements may be employed so that, for example, the end face of the contact tip may be arranged to abut directly against an end face of the conductor.

As mentioned above, the MIG welding utilizes a consumable electrode wire. This consumable electrode wire is commonly referred to as the welding wire and it is continuously fed through a guide tube known as a wire liner. The wire liner is situated within a central core tube of the power cable assembly. The gas passes along the length of the welding torch, from where it is directed over a weld being formed. Such known welding torches are basically air cooled and they normally use only the surrounding ambient air temperature to dissipate heat that builds up within the welding torch. The welding torches are thus given working duty cycles. Currently, the normal European duty cycle is 60% of a 5-minute cycle, that is 3 minutes of welding followed by two minutes of rest.

Accordingly to one embodiment of the present invention, the electrical conductor comprises an inner tube and an outer tube which is positioned over the inner tube, and the longitudinally extending passageway is positioned between the inner and outer tubes. With such an arrangement improved cooling may be achieved as compared with known welding torches. More specifically, the welding torch of the present invention will usually be air cooled, but it may be water cooled if desired. The gas is able to perform a cooling function, in addition to its function of shielding the weld being formed from atmospheric contamination. The cooling effect of the gas makes the welding torch more efficient than it would otherwise be. For example, in the case of an air cooled welding torch, the torch of the present invention is able to operate at a duty cycle of 80% as compared to the above mentioned normal duty cycle of 60%. The invention is based on the observation that the gas flow through normal welding torches is a simple and straight direct flow line, which has very little cooling effect since the gas used is only used for one purpose, which is to avoid atmospheric contamination of the weld being formed. By redirecting the gas flow, the gas can have an important second purpose, namely providing a cooling function to the welding torch.

Preferably, the welding torch is one in which the inner tube has a fluted outer profile, in which the outer tube is positioned over the fluted outer profile of the inner tube, and in which the longitudinally extending passageway is formed by spaces between the flutes. Other arrangements may be employed if desired so that, for example, the inner tube could be plain whilst the outer tube had inwardly directed flutes. Alternatively, the flutes could be screw threads.

The welding torch may have an axial central passageway which is blocked so that the gas cannot pass along the axial central passageway and is caused to be redirected along a heat cooling path through the welding torch. This is preferably effected by the welding torch being one which has metal to metal contact between the contact tip and the diffuser and between the diffuser and the electrical conductor, the metal to metal contact being such as to block axial central passageway and to redirect the flow of gas from the power cable assembly through the welding torch such that the redirected gas flows along the passageway between the inner and outer tubes of the neck portion and out of the welding torch through the aperture in the diffuser.

The welding torch may be one in which the neck portion comprises a first chamber which communicates with an upstream end of the electrical conductor and which receives the gas before it passes between the inner and outer tubes of the electrical conductor, in which the diffuser comprises a second chamber which communicates with a downstream end of the electrical conductor and which receives the gas from the inner and outer tubes of the electrical conductor, and in which the diffuser comprises a third chamber which causes the gas from the second chamber to flow over the contact tip before the gas leaves the welding torch.

BRIEF DESCRIPTION OF THE DRAWINGS

Embodiments of the invention will now be described solely by way of example and with reference to the accompanying drawings in which:

FIG. 1 is a side view of a welding torch for use in gas metal arc welding;

FIG. 2 is an exploded view of the welding torch as shown in FIG. 1;

FIG. 3 is a section through part of the welding torch shown in FIG. 1;

FIG. 4 is an exploded view of the part of the welding torch shown in FIG. 3;

FIG. 7 is a perspective view of part of a welding torch for use in gas metal arc welding;

FIG. 8 shows in detail a gas entry part of the welding torch;

FIG. 9 shows in detail a gas diffusion part of the welding torch;

FIG. 10 is a cross section through the welding torch;

DETAILED DESCRIPTION OF THE INVENTION

Figure 5:
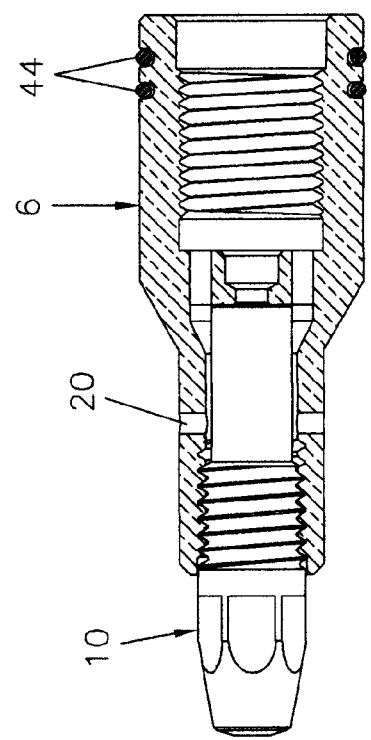
FIG. 5 is an enlarged view of a portion of the part of the welding torch as shown in FIG. 3.
Figure 6:
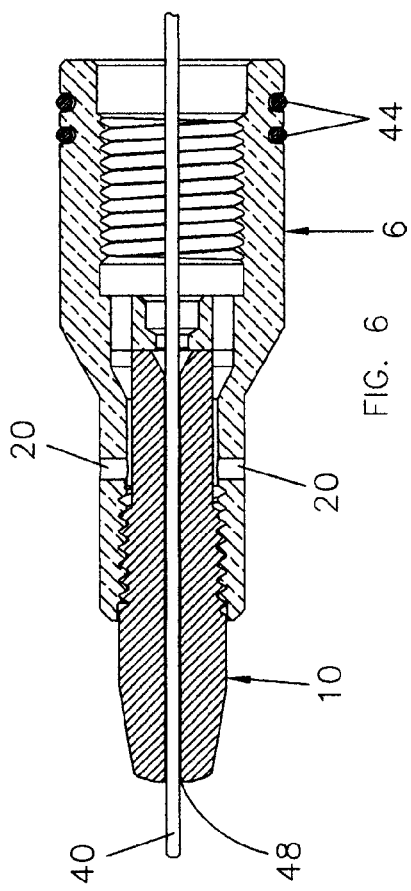
FIG. 6 is a section similar to FIG. 5 but shows the contact tip in section.

Referring to FIGS. 1–6, there is shown a welding torch 2 for use in gas metal arc welding. The gas metal arc welding is often referred to as MIG (metal inert gas) welding. The welding torch 2 comprises a neck portion 4, and a diffuser 6 at a first end 8 of the neck portion 4. A contact tip 10 extends from the diffuser 6. Connector means 12 is at a second end 14 of the neck portion 4. The connector means 12 is for connecting the neck portion 4 to a power cable assembly (not shown).

The neck portion 4 comprises an electrical conductor 16 and a longitudinally extending passageway 18. The power cable assembly supplies electricity and gas to the welding torch 2. The gas is for protecting welds from atmospheric contamination as the welds are made using the welding torch 2. The welding torch 2 is such that it causes the gas from the power cable assembly to flow along the passageway 18 and out of the welding torch 2 through apertures 20 in the diffuser 6.

The welding torch 2 is such that electrical current transfer from the electrical conductor 16 to the contact tip 10 is effected using a first contact area 22 and a second contact area 24. The first and second contact areas 22, 24 are on the contact tip 10 and they are longitudinally separated from each other as shown in FIG. 3. The first contact area 22 is formed by an end face 26 of the contact tip 10 adjacent the diffuser 6. The second contact area 24 is formed by a threaded portion 28 of the contact tip 10. The threaded portion 28 secures the contact tip 10 in the diffuser 6.

The welding torch 2 is such that it includes a gas chamber 30. As best seen in FIG. 3, the gas chamber 30 is positioned longitudinally between the two contact areas 22, 24. The gas chamber 30 is also positioned radially between the contact tip 10 and the diffuser 6. As indicated by the arrows in FIG. 3, the gas in the gas chamber 30 flows over a part 30 of the contact tip between the two contact areas 22, 24. The gas cools this part 32 of the contact tip 10 before flowing out of the welding torch 2 through the apertures 20.

The end face 26 of the contact tip 10 abuts against a transverse face 34 of an internal part 36 of the diffuser 6. Thus the end face 26 and the transverse face 34 are in good electrically conducting metal to metal contact. The threaded portion 28 also gives good electrically conducting metal to metal contact.

The welding torch 2 is also shown having a heat shield 38 and a consumable wire electrode 40. The consumable wire electrode 40 is used up as it passes continuously through the end of the contact tip 10. Gas passing from the apertures 20 in the diffuser 6 shield the weld being formed from atmospheric contamination. The consumable wire electrode 40 passes through the welding torch 2 in a coiled tube known as a liner 42.

A pair of spring seals 44 are employed as shown. The spring seals 44 secure a shielding gas nozzle (not shown) that directs the diffused shielding gas flow to the weld being formed.

The welding torch 2 is able to operate very efficiently with good electrical current transfer from the electrical conductor 16 to the contact tip 10. The cooling effect of the gas helps to stop the contact tip 6 expanding and self-annealing, thus becoming soft and providing a poor wear resistance. The cooling gas also helps to stop the contact tip 6 adversely affecting the free movement between the bore 48 in the contact tip and the consumable wire electrode 40.

Referring to FIGS. 7–12, there is shown a welding torch 102 for use in gas metal arc welding. The gas metal arc welding is that known as MIG welding. The welding torch 102 comprises a neck portion 104, a diffuser 106 at a first end 108 of the neck portion 104, and a contact tip 110 which extends from the diffuser 106. Connector means 112 is provided at a second end 114 of the neck portion 104. The connector means 112 is for connecting the neck portion 104 to a power cable assembly 116.

The neck portion 104 is such that it comprises an electrical conductor 118. The electrical conductor 118 comprises an inner tube 120, an outer tube 122 which is positioned over the inner tube 120, and a longitudinally extending passageway 124 between the inner and outer tubes 120, 122.

The power cable assembly 116 is such that it supplies electricity and gas to the welding torch 102. The gas is for protecting welds from atmospheric contamination as the welds are being made using the welding torch 102.

The welding torch 102 is such that it causes the gas from the power cable assembly 116 to flow along the longitudinally extending passageway 124 between the inner and outer tubes 120, 122 of the neck portion 104 and out of the welding torch 102 through apertures 126 in the diffuser 106.

The inner tube 120 has a fluted outer profile having flutes 128. The outer tube 122 is positioned over the flutes 128 so that it is positioned over the fluted outer profile of the inner tube 120. The passageway 124 is formed by spaces 130 between the flutes 128.

The welding torch 102 has an axial central passageway 132 which, in a known welding torch, would form a simple and direct path for the gas from the power cable assembly 116 to the diffuser 106 of the welding torch 102. However, with the welding torch 102 of the present invention, the axial central passageway 132 is blocked so that the gas cannot pass along the axial central passageway 132. The gas is caused to be redirected along a heat cooling path through the welding torch 102. More specifically, the welding torch 102 has metal to metal contact between the contact tip 110 and the diffuser 106, and between the diffuser 106 and the electrical conductor 118. This metal to metal contact is such as to block the axial central passageway 132. This metal to metal contact is also such as to redirect the flow of gas from the power cable assembly 116 through the welding torch 102 such that the redirected gas flows along the passageway 124 between the inner and outer tubes 120, 122 of the neck portion 104 and out of the welding torch 102 through the apertures 126 in the diffuser 106.

The neck portion 104 comprises a first chamber 134 which communicates with an upstream end of the electrical conductor 118 and which receives the gas before it passes between the inner and outer tubes 120, 122 of the electrical conductor 118. The diffuser 106 comprises a second chamber 136 which communicates with a downstream end of the electrical conductor 118 and which receives the gas from the inner and outer tubes 120, 122 of the electrical conductor 118 before the gas passes to the apertures 126 in the diffuser 106.

The first end 108 is screw threaded as shown in FIG. 7 so that the diffuser 106 can screw over the first end 108 as shown in FIG. 9. The connector means 112 is internally screw threaded as shown in FIG. 8 so that an externally threaded tube 138 can screw into the connector means 112, thereby connecting the power cable assembly 116 to the second end 114 of the welding torch 102 via the connector means 112. A lock nut 140 ensures that everything is retained in position.

The cross section shown in FIG. 10 illustrates how the outer tube 122 is supported on the flutes 128 of the inner tube 120. The spaces 130 between the flutes 128 form the passageway 124. The outer tube 122 is in a moulded portion 142 of the neck portion 104. As can best be seen from FIG. 7, the entire neck portion 104 has an outer plastic moulding 144.

Figure 12:
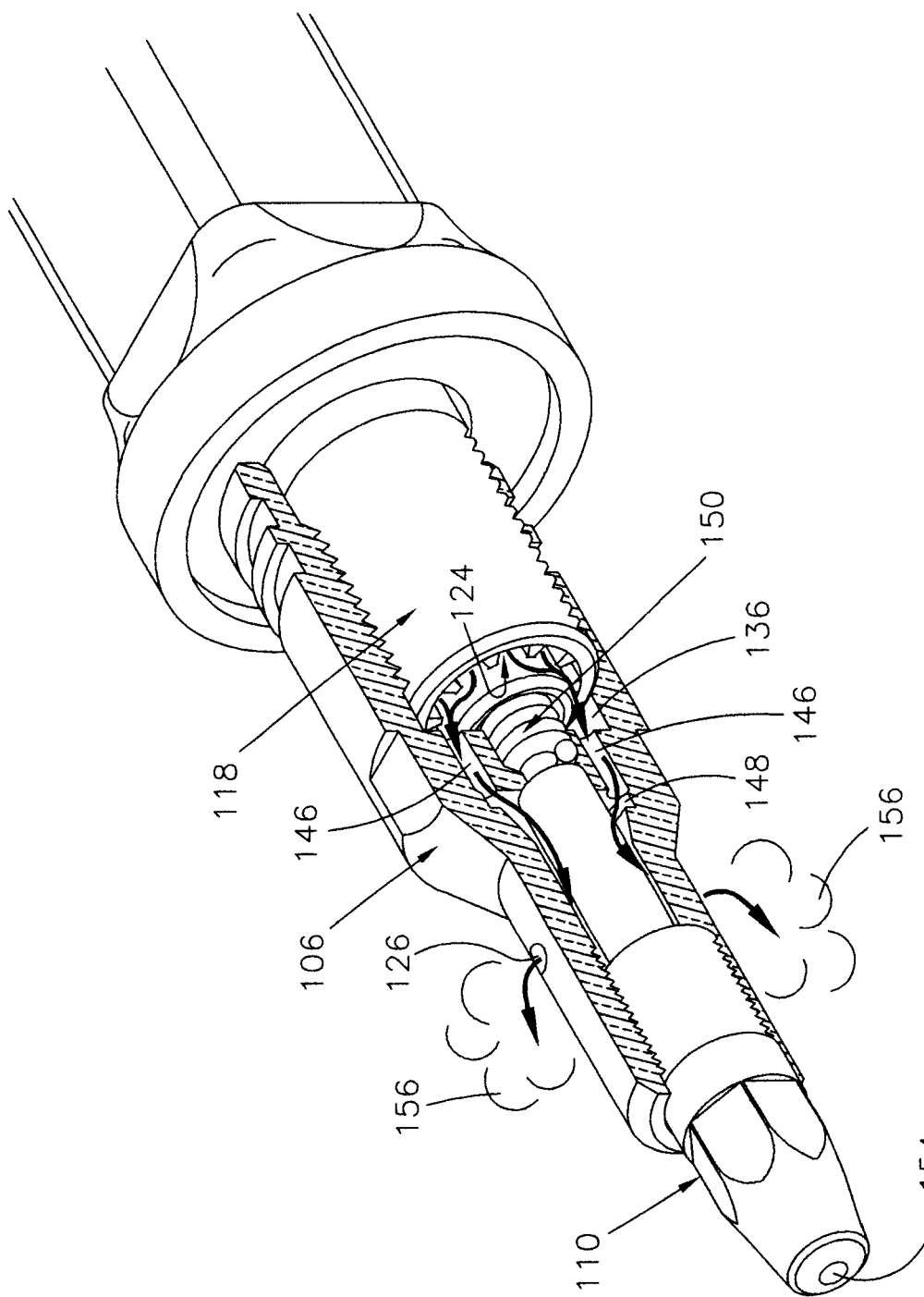
FIG. 12 is an enlarged view of FIG. 9.

FIG. 12 shows most clearly how the gas from the passageway 24 passes into the second chamber 136. The gas then passes through axial bores 146 into a third chamber 148. The gas then passes out of the diffuser 106 through the apertures 126. This flow of the gas is in contrast to the gas flow in a known welding torch which passes directly from the power cable assembly to the diffuser and out of the welding torch. In the known welding torch, the gas does not make direct contact with any surface of the contact tip before the gas leaves the welding torch. In the welding torch 102 of the present invention, the third chamber 148 causes the gas to flow over the exposed surface area of the contact tip before the gas leaves the welding torch 102.

Figure 11:
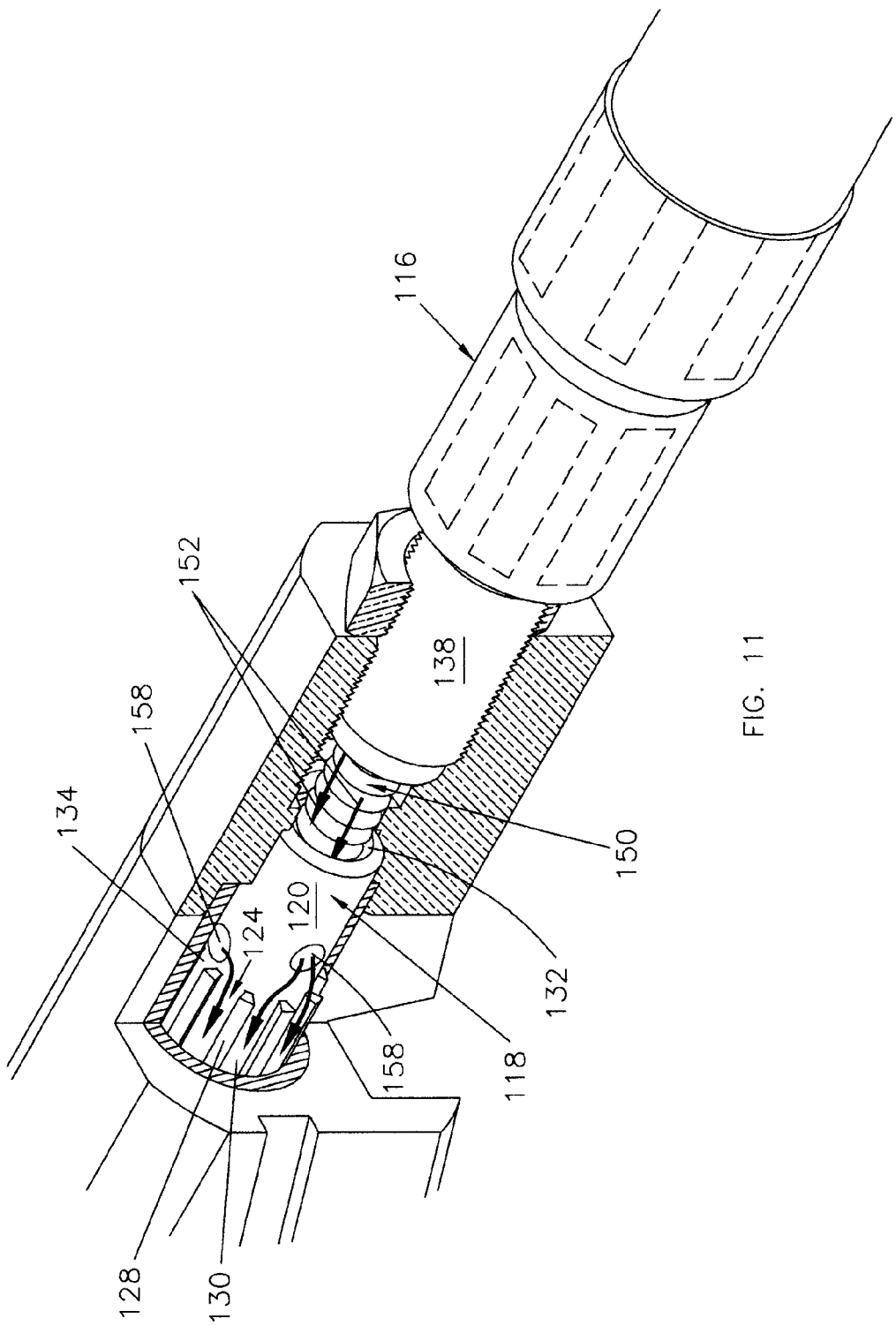
FIG. 11 is an enlarged view of FIG. 8.

FIGS. 11 and 12 show how the welding torch 102 has a liner 150 which extends from the power cable assembly 116 through the welding torch 102. As indicated by arrows 152 in FIG. 11, the gas provided by the power cable assembly 116 passes over the liner 150. The liner 150 acts as a guide tube for the consumable electrode wire (not shown) which passes through the center of the liner 150 and extends through an aperture 154 at the end of the contact tip 110. It is this consumable electrode wire which is consumed during the welding conducted with the welding torch 102. During welding, a weld pool (not shown) forms and is protected by a blanket 156 of the welding gas as illustrated in FIGS. 9 and 12. Any suitable and appropriate gas may be employed and provided by the power cable assembly 116. The power cable assembly 116 can be any suitable and appropriate known power cable assembly 116. As the gas passes in the direction of the arrows 152, it passes along the axial central passageway 132 formed between the outside of the liner 150 and the inside of the inner tube 120. Because this axial central passageway 132 is blocked by the metal to metal contact between the contact tip 110 and the diffuser 106, and between the diffuser 106 and the electrical conductor 118, the gas is caused to be redirected through apertures 158 in the inner tube 120 and then along the passageway 124 as described above.

It is to be appreciated that the embodiments of the invention described above with reference to the accompanying drawings have been given by way of example only and that modifications may be effected. Thus, for example, different types of gases can be used in the welding torch 2, and they can be used at different flow rates. The welding torch 2 and its various parts may be of different shapes to those shown. Preferably, the welding torch of the present invention has a fluted inner tube or alternatively and internally fluted outer tube. If desired however an alternative arrangement may be employed of a coarse thread formed on the outer of the inner tube or the inner of the outer tube, with the gas flowing through the groove of the thread. The outer profile of the neck portions 4, 104 may be different from those shown.

What is claimed is:

1. A welding torch for use in gas metal arc welding, which welding torch comprises a neck portion, a diffuser at a first end of the neck portion, a contact tip which extends from the diffuser, and connector means which is at a second end of the neck portion and which is for connecting the neck portion to a power cable assembly: the neck portion being such that it comprises an electrical conductor and a longitudinally extending passageway; the power cable assembly being such that it supplies electricity and gas to the welding torch, the gas being for protecting welds from atmospheric contamination as the welds are made using the welding torch; the welding torch being such that it causes the gas from the power cable assembly to flow along the longitudinally extending passageway and out of the welding torch through at least one aperture in the diffuser; the welding torch being such that the electrical current transfer from the electrical conductor to the contact tip is effected using first and second longitudinally separated contact areas on the contact tip, the first contact area being an end face of the contact tip adjacent the diffuser, and the second contact area being a threaded portion of the contact tip which secures the contact tip in the diffuser; and the welding torch being such that it includes a gas chamber which is positioned longitudinally between the two contact areas and radially between the contact tip and the diffuser whereby the gas in the gas chamber flows over a part of the contact tip between the two contact areas and cools this part of the contact tip before flowing out of the welding torch through the said at least one aperture in the diffuser.

2. A welding torch according to claim 1 in which the end face of the contact tip abuts against a transverse face of an internal part of the diffuser.

3. A welding torch according to claim 1 in which the electrical conductor comprises an inner tube and an outer tube which is positioned over the inner tube, and in which the longitudinally extending passageway is positioned between the inner and outer tubes.

4. A welding torch according to claim 3 in which the inner tube has a fluted outer profile, in which the outer tube is positioned over the fluted outer profile of the inner tube, and in which the longitudinally extending passageway is formed by spaces between the flutes.

5. A welding torch according to claim 3 and which has an axial central passageway which is blocked so that the gas cannot pass along the axial central passageway and is caused to be redirected along a heat cooling path through the welding torch.

6. A welding torch according to claim 3 and which has metal to metal contact between the contact tip and the diffuser and between the diffuser and the electrical conductor, the metal to metal contact being such as to block the axial central passageway and to redirect the flow of the gas from the power cable assembly through the welding torch such that the redirected gas flows along the passageway between the inner and outer tubes of the neck portion and out of the welding torch through the aperture in the diffuser.

7. A welding torch according to claim 3 in which the neck portion comprises a first chamber which communicates with an upstream end of the electrical conductor and which receives the gas before it passes between the inner and outer tubes of the electrical conductor, in which the diffuser comprises a second chamber which communicates with a downstream end of the electrical conductor and which receives the gas from the inner and outer tubes of the electrical conductor, and in which the diffuser comprises a third chamber which causes the gas from the second chamber to flow over the contact tip before the gas leaves the welding torch.

* * * * *